United States Patent [19]

Stearley

[11] 4,008,419
[45] Feb. 15, 1977

[54] SHIELDED CONTROL DEVICE THEREFOR

[75] Inventor: John W. Stearley, Indiana, Pa.

[73] Assignee: Robertshaw Controls Company, Richmond, Va.

[22] Filed: Aug. 4, 1975

[21] Appl. No.: 601,515

Related U.S. Application Data

[62] Division of Ser. No. 490,511, July 22, 1974, Pat. No. 3,914,660.

[52] U.S. Cl. .............................. 361/334; 174/5 R; 174/66; 219/522; 334/85
[51] Int. Cl.² .......................................... H02B 1/04
[58] Field of Search .............. 317/117, 120, 101 R, 317/112, 118; 334/85; 219/327–330, 310–312, 520, 522; 174/5 R, 66, 138 F; 200/304, 305, 11 R, 329, 336; 325/252, 253, 357, 360; 220/241

[56] References Cited

UNITED STATES PATENTS

| | | | |
|---|---|---|---|
| 3,242,293 | 3/1966 | Manecke | 219/330 |
| 3,523,217 | 8/1970 | Stiles | 317/120 |
| 3,621,197 | 11/1971 | Place | 174/5 R |
| 3,626,151 | 12/1971 | Them | 174/5 R |
| 3,904,937 | 9/1975 | Levin | 317/120 |

Primary Examiner—Gerald P. Tolin
Attorney, Agent, or Firm—Candor, Candor & Tassone

[57] ABSTRACT

A control device having a housing provided with a selector knob and dial arrangement adjacent the knob, the housing also having electrical terminals adjacent the knob and dial arrangement. A substantially flat protective shield is secured to the control device and covers the terminals, the shield having an opening passing therethrough to expose the dial arrangement and have the selector knob telescopically projecting therethrough. The selector knob has a tongue portion thereof overlapping the shield to hold the shield to the control device.

3 Claims, 6 Drawing Figures

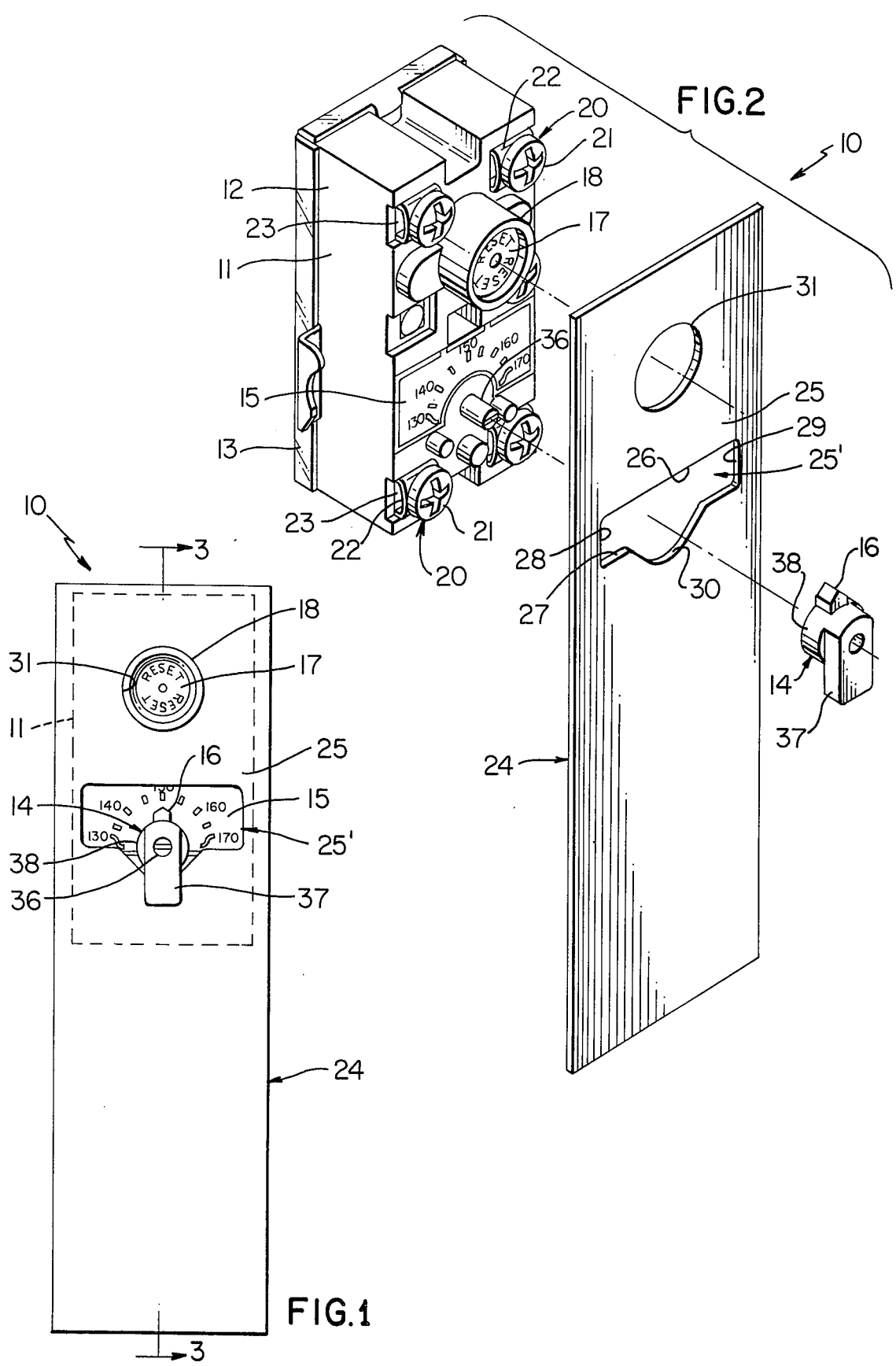

SHIELDED CONTROL DEVICE THEREFOR

This application is a division of its copending parent patent application, Ser. No. 490,511, filed July 22, 1974, now U.S. Pat. No. 3,914,660.

This invention relates to a shielded control device as well as to an improved protective shield therefor.

It is well known that various control devices have been provided wherein each has a housing means provided with a selector knob for setting the control device to a particular operating condition thereof. Such control device also has terminal means for permitting leads to be attached thereto and, in certain cases, such lead attachment is relatively close to the selector knob location so that it is desired to protect the user from accidentally contacting such terminals when adjusting the selector knob.

For example, such control devices can comprise thermostats that are mounted on water heaters for controlling the heating operation thereof in relation to the temperature setting set by the selector knobs thereof.

Accordingly, protective electrically insulating shields have been provided that can be secured to such control devices to cover not only the terminal means of the control devices, but also to cover adjacent electrical structure while still permitting ready access to the selector knobs for temperature selection purposes.

For example, see the U.S. Pat. No. 3,621,197 to Place, and the U.S. Pat. No. 3,626,151 to them.

It is a feature of this invention to provide an improved protective shield of the above general type for shielding the terminal means of such a control device or the like while still effectively exposing the selector knob thereof for condition setting purposes and the like.

It is another feature of this invention to provide an improved shielded control device utilizing such a protective shield or the like.

In particular, one embodiment of this invention provides a control device having a housing provided with a selector knob and dial arrangement adjacent the knob, the housing having electrical terminal means adjacent the knob and dial arrangement. A substantially flat protective shield is secured to the control device and covers the terminal means thereof, the shield having opening means passing therethrough to expose the dial arrangement and have the selector knob projecting therethrough to permit manual grasping of the same. The selector knob has a tongue portion thereof overlapping the shield to hold the shield to the control device.

Accordingly, it is an object of this invention to provide an improved shielded control device having one or more of the novel features set forth above or hereinafter shown or described.

Another object of this invention is to provide an improved protective shield for such a control device or the like.

Other objects, uses and advantages of this invention are apparent from a reading of this description, which proceeds with reference to the accompanying drawings forming a part hereof and wherein:

FIG. 1 is a front view of the improved shielded control device of this invention.

FIG. 2 is an exploded perspective view illustrating the control device and protective shield therefor.

Figure 4:
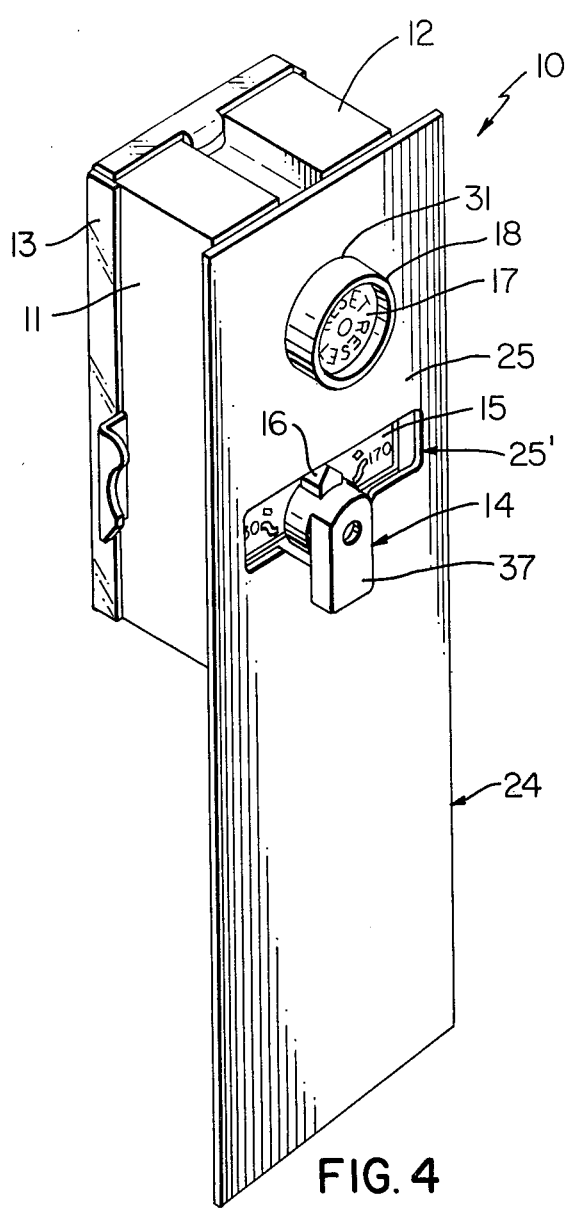
FIG. 4 is a perspective view of the shielded control device of FIG. 1.

While the various features of this invention are hereinafter described and illustrated as being particularly adapted to provide a protective shield for a control device that is utilized for temperature controlling purposes, it is to be understood that the various features of this invention may be utilized singly or in any combination thereof to provide a protective shield for other types of control devices as desired.

Therefore, this invention is not to be limited to only the embodiment illustrated in the drawings, because the drawings are merely utilized to illustrate one of the wide variety of uses of this invention.

Referring now to FIGS. 1 and 2, the improved shielded control device arrangement of this invention is generally indicated by the reference numeral 10 and comprises a control device 11 having a one-piece housing 12 closed by a rear cover means 13 and containing suitable electrical switch means, temperature sensing means and the like for effectively controlling the heating operation of a water heater or the like. The housing 12 carries a selector knob 14 and dial arrangement 15 adjacent thereto for permitting the user to select the desired temperature setting for the control device 11 in a manner well known in the art whereby the positioning of a pointer 16 on the control knob 14 to a desired temperature indication on the dial arrangement 15 will cause the control device 11 to tend to maintain the temperature of the water heater at such selected temperature.

The housing 12 also carries a reset button 17 disposed in a cylindrical projection 18 thereof so that should the sensed temperature exceed a certain high limit, other switching means in the control device 11 will terminate the operation thereof until the reset button 17 is pressed to reset the control device 11 in a manner well known in the art.

In order to interconnect suitable electrical leads to the control device 11, a plurality of terminal means 20 are carried by the housing means 12 and each can comprise a threaded fastening member 21 for clamping a bared wire lead end beneath a deformable clip 22 and a conductive surface 23 that leads to the interior of the housing means 12 so that such lead will be attached to the housing means 12 and be electrically interconnected to the conductor 23 thereof.

As previously stated, it can readily be seen that such terminal means 20 are disposed relatively close to the selector knob 14 as well as to the reset button 17 so that when such control device 11 is mounted to a water heater or the like and a person desires to adjust the temperature setting thereof, a person might accidentally contact one of the terminal means 20 and thereby be subjected to an adverse electrical shock, etc.

Accordingly, a protective shield of this invention that is generally indicated by the reference numeral 24 is utilized to shield the terminal means 20 of the control device 11 in the manner illustrated in FIG. 1 by being attached to the housing 12 of the control device 11 while still exposing the control knob 14, dial arrangement 15 and reset button 17 at the front surface 25 of the shield 24. Thus, the operator can have access to the control parts of the control device 11 while the terminal means 20 are effectively covered by the shield 24 at the front surface 25 thereof. Additionally, the shield 24 of this invention can be so constructed and arranged so that the same will extend beyond the control device 11 in any desired direction and distance to effectively cover electrical control means that will be mounted in an associated manner with the control device 11 as provided in the aforementioned U.S. Pat. Nos. 3,261,197 and 3,626,151.

The protective shield 24 of this invention can be formed of any suitable electrical insulating material.

The shield 24 has a first opening means 25' formed therethrough and defining a substantially rectangular area bordered by two pairs of opposed side edge means 26, 27 and 28, 29 of the shield 24 with the edge means 27 having an arcuate portion 30 formed therein with its concave side facing into the rectangular opening means 25' for a purpose hereinafter described.

Figure 3:
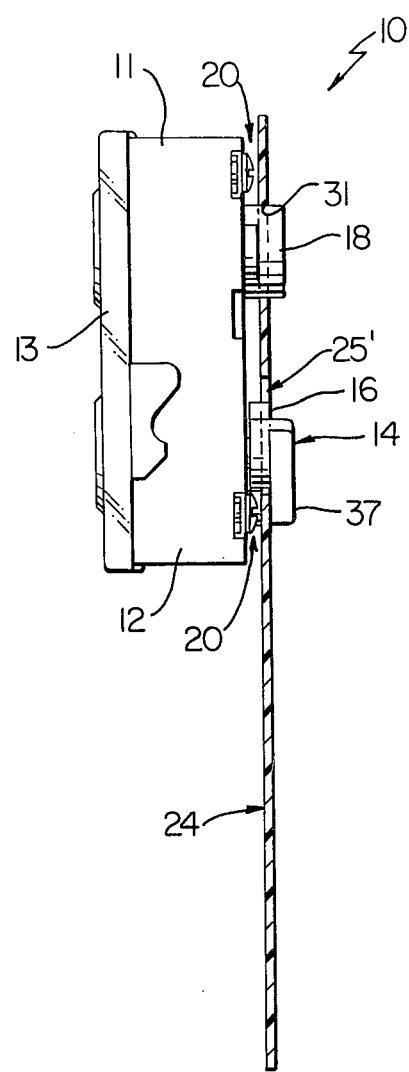
FIG. 3 is a cross-sectional view taken substantially on line 3—3 of FIG. 1.
Figure 5:
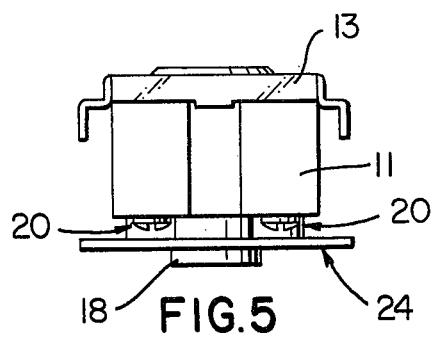
FIG. 5 is a top view of the shielded control device of FIG. 1.
Figure 6:
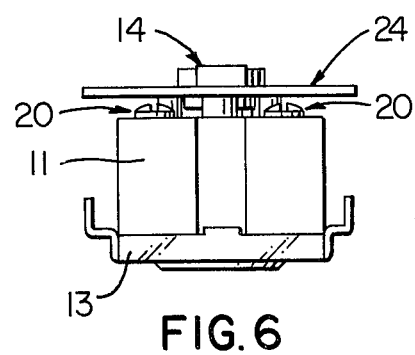
FIG. 6 is a bottom view of the shielded control device of FIG. 1.

The shield 24 has another opening 31 passing therethrough to telescopically receive, in a press-fit manner, the cylindrical part 18 of the housing means 12 of the control device 11 as illustrated in FIGS. 1 and 3 as hereinafter described.

The selector knob 14 of the control device 11 is adapted to be press fit or otherwise assembled on a control shaft 36 thereof and is provided with a tongue portion 37 disposed at one end of a cylindrical portion 38 thereof with the tongue portion 37 extending in a diametrically opposite direction from the pointer 16 for a purpose hereinafter described.

Thus, it can be seen that the protective shield 24 of this invention can be formed from a single blank of material and merely have the openings 25' and 31 cut or otherwise formed therein in the configurations illustrated and then be assembled to the control device 11 in a manner now to be described.

After the control device 11 has been assembled to the water heater and had the leads attached to the terminal means 20 thereof in the manner previously described, the shield 24 can be disposed over the control knob 14 and be assembled in place through flexure of the shield 24 in such a manner that the shield 24 is disposed against the front of the control device 11 so that the cylindrical part 18 thereof is telescopically received in the opening means 31 in a press fit manner while the shield 24 is moved against the front of the housing 11 in the manner illustrated in FIG. 3 whereby the control shaft 36 is telescopically disposed through the opening means 25' of the shield 24. Thus, it can be seen that the cylindrical part 38 of the control knob 14 is disposed coplanar with the cutout 30 in the side edge 27 of the opening 25' to accommodate rotation of the control knob 14 while the tongue 37 overlaps the body portion of the shield 24 to lock the same to the control device 11 in a manner to completely cover the terminal means 20 and the leads attached thereto as readily illustrated in FIG. 1.

In this manner, the dial arrangement 15 and selector knob 14 are readily viewable and accessible through the opening means 25' and the reset button 17 is readily accessible through the opening means 31 of the shield 24 so that the operator can set the control device 11 at the desired temperature setting thereof and change such setting whenever desired without being exposed to the terminal means 20 as would be the case if the shield 24 of this invention were not utilized.

Therefore, it can be seen that this invention not only provides an improved shielded control device arrangement, but also this invention provides an improved protective shield therefor.

While the form of the invention now preferred has been illustrated and described as required by the Patent Statute, it is to be understood that other forms can be utilized, and still come within the scope of the appended claims.

What is claimed is:

1. A substantially flat protective shield for a control device having a housing provided with a selector knob and dial arrangement adjacent said knob as well as electrical terminal means adjacent said knob and dial arrangement, said protective shield being adapted to be secured to said control device and cover said terminal means, said shield having opening means therethrough adapted to expose said dial arrangement and have said selector knob project therethrough so that a tongue portion of said knob can overlap said shield to hold said shield to said control device, said opening means being substantially rectangular to define two pair of opposed side edges bordering said opening means, one of said opposed side edges of one pair of side edges having a concave portion thereof adapted to face said knob and complement the telescoping portion of said knob, said shield comprising a flat blank of electrical insulating material having opposed flat parallel sides without any projections therefrom.

2. A protective shield as set forth in claim 1 wherein said shield has another opening means adapted to telescopically receive a projecting part of said housing.

3. A protective shield as set forth in claim 1 wherein said flat blank is substantially rectangular.

* * * * *